United States Patent
Pisano et al.

(10) Patent No.: US 6,625,987 B2
(45) Date of Patent: Sep. 30, 2003

(54) CONTROL STRATEGY FOR GAS TURBINE ENGINE

(75) Inventors: Alan David Pisano, Chestnut Hill, MA (US); James Patrick Conaty, Swampscott, MA (US); Matthew William Wiseman, Fairfield, OH (US); Sabrina Anne Sequeira, Somerville, MA (US)

(73) Assignee: General Electric Co., Schenectady, NY (US)

( * ) Notice: Subject to any disclaimer, the term of this patent is extended or adjusted under 35 U.S.C. 154(b) by 0 days.

(21) Appl. No.: 09/919,029

(22) Filed: Jul. 31, 2001

(65) Prior Publication Data

US 2003/0024235 A1 Feb. 6, 2003

(51) Int. Cl.[7] ................................................. F02C 9/46
(52) U.S. Cl. ............................. 60/773; 60/223; 701/100
(58) Field of Search ..................... 60/772, 773, 39.281, 60/223; 701/100

(56) References Cited

U.S. PATENT DOCUMENTS

| 3,771,314 A | | 11/1973 | Rose, Jr. et al. |
| 3,937,588 A | | 2/1976 | Kisslan |
| 4,249,238 A | * | 2/1981 | Spang et al. ................. 701/100 |
| 5,072,580 A | * | 12/1991 | Patterson et al. ........... 701/100 |
| 5,622,045 A | * | 4/1997 | Weimer et al. ................ 60/223 |
| 5,887,419 A | * | 3/1999 | Rowe et al. ................... 60/223 |

* cited by examiner

Primary Examiner—Michael Koczo
(74) Attorney, Agent, or Firm—William Scott Andes; Armstrong Teasdale LLP; Robert B. Reeser, III

(57) ABSTRACT

A control strategy for a gas turbine engine which exchanges future lifetime of the engine for present thrust. Gas turbine engines, such as those used in aircraft, sometimes incur damage, as when they ingest birds, or are struck with ballistic objects fired by an enemy. The invention detects the damage, and invokes a control strategy wherein the engine is operated in a more harsh manner, thereby sacrificing a significant part of the remaining lifetime of the engine, in order to obtain thrust currently.

13 Claims, 4 Drawing Sheets

US 6,625,987 B2

CONTROL STRATEGY FOR GAS TURBINE ENGINE

STATEMENT REGARDING FEDERALLY SPONSORED RESEARCH & DEVELOPMENT

The invention was made with Government support under Contract No. N68936-99-C-0117, awarded by the U.S. Government. The Government has certain rights in this invention.

TECHNICAL FIELD

The invention concerns control systems for gas turbine engines.

BACKGROUND OF THE INVENTION

In a gas turbine engine used to power an aircraft, malfunctions sometimes occur. While many malfunctions are minor, some are significant enough to reduce thrust of the engine to a large degree. For example, if the engine ingests a large bird, damage can occur which significantly compromises the thrust-producing ability of the engine. As another example, a missile fired by a terrorist can produce similar damage, or worse. As a third example, during take-off, the engine can ingest debris left on a runway.

In such cases, the pilot can take at least two strategies. One is to continue operation of the engine, but at the reduced thrust level. The second is to shut down the engine. The invention provides another strategy for operating a malfunctioning gas turbine engine.

SUMMARY OF THE INVENTION

In one form of the invention, a system detects damage in a gas turbine engine, as by detecting a lower-than-expected amount of thrust. When the damage is detected, the invention then takes measures to exchange (1) future lifetime of the engine for (2) present thrust.

For example, the invention may increase a limit on speed of a particular rotor, which consumes lifetime of the rotor and other components, but produces larger thrust presently. As another example, a limit on turbine inlet temperature may be raised, which again consumes lifetime of components, but produces larger thrust presently.

DETAILED DESCRIPTION OF THE INVENTION

This discussion will present (1) a simplified example of one form of the invention, and then (2) a more general description.

Figure 1:
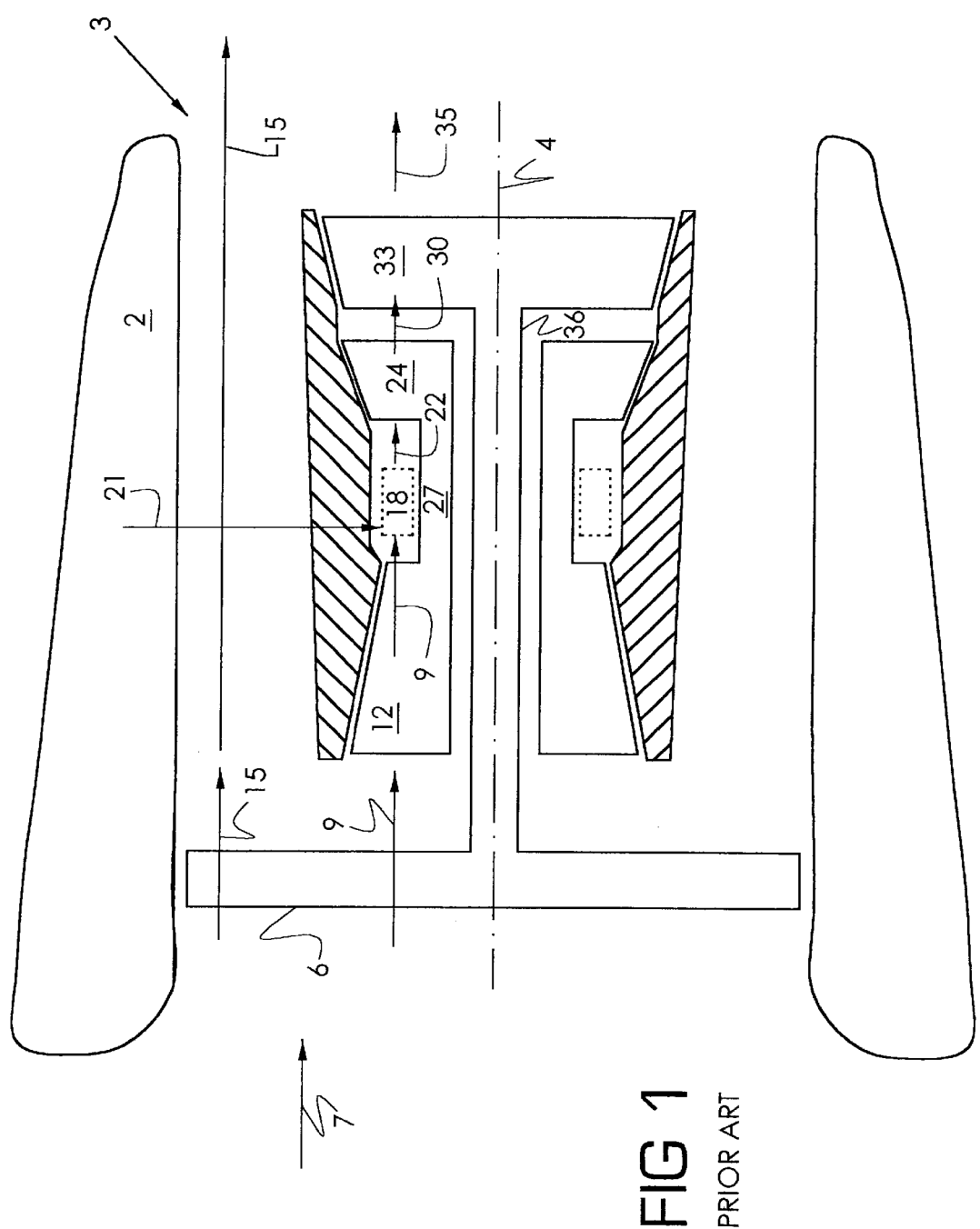
FIG. 1 is a simplified, block-type schematic of a gas turbine aircraft engine within a nacelle 2.

FIG. 1 illustrates a simplified gas turbine engine 3, which is symmetrical about centerline 4. A fan 6 compresses incoming air 7, and delivers part 9 to a high-pressure compressor 12. The other part 15 is bypassed, and used to generate thrust. The high-pressure compressor 12 further compresses the air, and delivers it to a combustor 18, wherein fuel 21 is delivered and burns, adding energy to the air in the form of heat.

The high-energy fuel/air mixture 22 is then ducted to a high-pressure turbine 24, which extracts mechanical energy from the mixture, and uses that energy to drive the high-pressure compressor 12, through shaft 27. The exhaust 30 of the high-pressure turbine 24 is ducted to a low-pressure turbine 33, which extracts further mechanical energy, and uses that energy to drive the fan 6, through shaft 36. The exhaust 35 of the low-pressure turbine 33 is utilized to produce thrust, to the extent possible.

Figure 2:
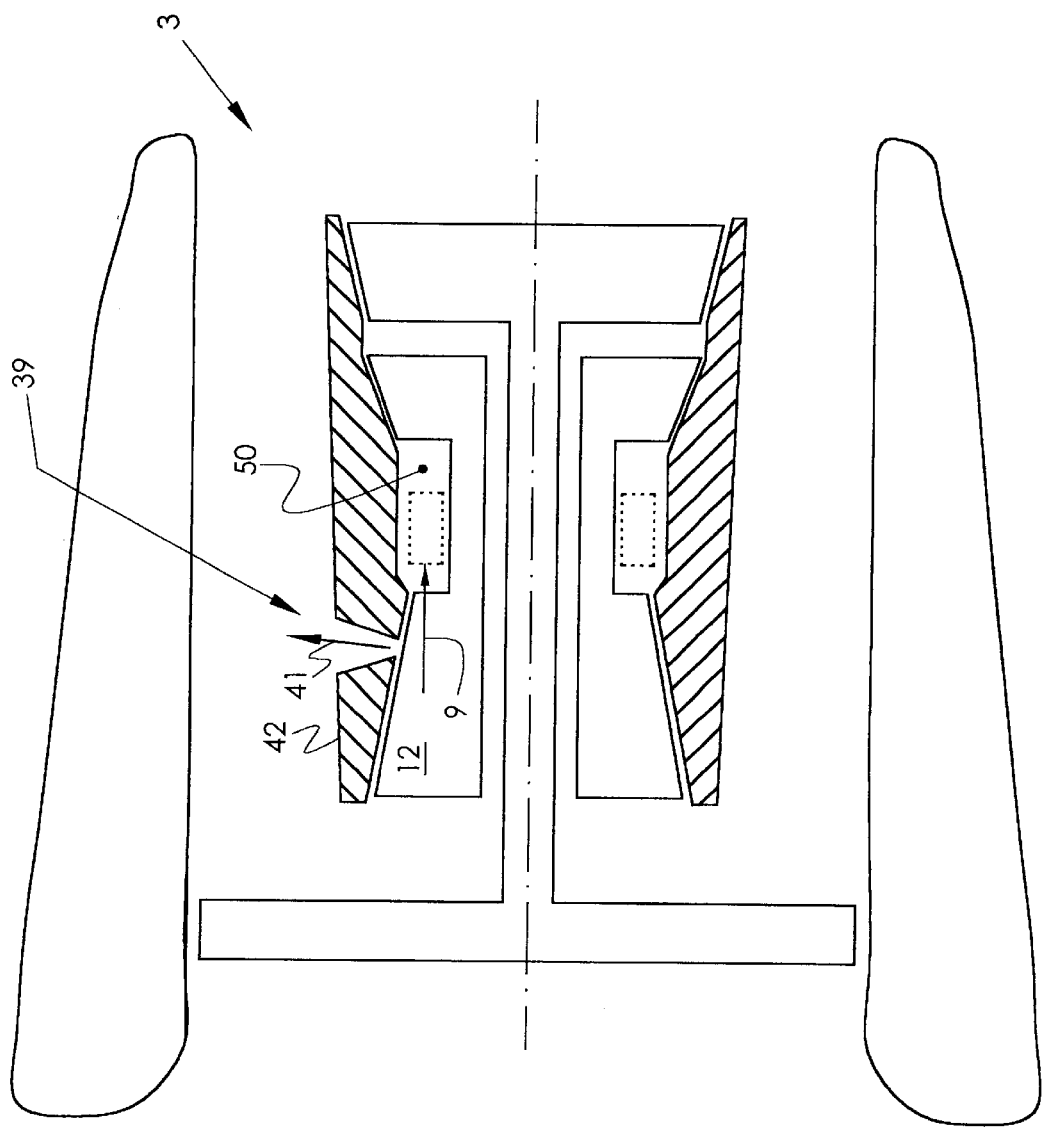
FIG. 2 shows the engine of FIG. 1, but with a hole 39 in a compressor casing 42.

Assume that, as in FIG. 2, damage to the engine 3 occurs, in the form of a hole 39 in the casing 42 which surrounds the high-pressure compressor 12. This damage may be inflicted, for example, in wartime by a projectile which strikes the engine.

With the hole 39 present, compressor efficiency is reduced, because of the loss of air 41. The air 9 delivered to the combustor 18 is reduced in mass flow and pressure. As a consequence, thrust of the engine 3 will be reduced.

The invention detects the reduction in compressor efficiency, that is, makes an inference that damage has occurred. Next, the invention will take steps to compensate for this reduction in efficiency.

The invention implements a strategy which will trade (1) the long-term lifetime of the engine for (2) a temporary present increase in thrust. That is, a reduction in future lifetime of the engine is exchanged for current thrust. Some background principles explaining how this strategy is possible will be elaborated.

In brief, many of the components in a gas turbine engine operate under harsh conditions which deviate greatly from standard, ambient resting conditions of temperature and pressure. The harsh conditions cause wear-and-tear on the components, giving the components a limited useful life. The invention operates the engine under harsher-than-normal conditions, to obtain increased thrust, but at the cost of reducing the lifetimes of many of the components.

To explain these principles in greater detail, it is pointed out that some components operate in a very high centrifugal force field. In general, the centrifugal acceleration of a rotating component is (w-squared)×(r), wherein w is angular rotation in radians per second, and r is the distance of the body from the center of rotation.

If the radius of the high-pressure compressor 12 in FIG. 1 is one foot, and if it rotates at 10,000 rpm, which corresponds to 167 revolutions per second, then the centrifugal acceleration is (2×PI×167)×(2×PI×167)×(1/sec-squared)×(1 foot), or about 1.1 million feet/sec-squared. Dividing this by the acceleration of gravity, 32 feet/sec-squared, gives a g-field of about 34,000 G's.

Thus, this compressor 12 operates under an extremely high G-field: a compressor blade which ordinarily weighs one pound will weigh 34,000 pounds in operation.

In addition, some components are subjected to very high temperatures, some of which actually exceed the melting temperatures of the materials used. Components subject to the latter temperatures must be actively cooled, to keep them below the melting temperature. Also, high pressures, sometimes exceeding 400 pounds per square inch, are present, which stress materials.

The high G-fields, the high temperatures, and the high pressures illustrate three factors which place high stresses on the materials within the engine.

Not only do these three factors, by themselves, generate high stresses, but also the fact that they are applied in a cyclic manner creates additional stress and wear. That is, when the engine is at rest, these factors are absent. But when the engine is brought into operation, the three factors, previously absent, come into existence and apply stresses to the engine.

The repeated application of stresses, followed by relaxation of the stresses, creates fatigue in materials, often resulting in stress cracks. In fact, the usable lifetime of many parts, or at least an outer limit on their usability, is measured by the number of such cycles the part has experienced.

Another factor is the law of physics which states that, as temperature increases, the tensile strength of many materials decreases. Further, components made of such materials may experience a type of deformation known as creep. Thus, if a component is operated under high stress at an excessively high temperature, that component may become permanently deformed. Further, the creep does not necessarily arise immediately, but sometimes after long-term exposure to the stresses just described.

These stresses, and their cyclic nature, motivate the designers of the gas turbine engines to impose strict limits on the operating conditions of the engines, to thereby limit the maximal stresses applied to the components within the engine. For example, the temperature of the gas at point 50, in FIG. 2, called turbine inlet temperature, is held to a certain limit. If the control system (not shown) detects that the limit is being exceeded, it takes certain measures to reduce it and, if those measures fail, may shut down the engine.

Therefore, to summarize these background principles: in normal operation, the engine control system maintains many components within a gas turbine engine within specific envelopes of temperature, pressure, and rotational speeds. A primary purpose of maintaining the components within their envelopes is to maximize the useful life of the engine.

The invention makes an exception to this control strategy in certain situations. In the case when a drop in compressor efficiency is detected, as when hole 39 in FIG. 2 occurs, the invention determines that maximizing lifetime of the engine is no longer of prime importance. Rather, obtaining continued thrust from the engine, even for a limited period of time, is assigned higher priority, even if that means ultimately sacrificing significant lifetime of the engine.

To this end, the invention alters the envelopes just described. The invention alters the limits previously imposed on one, or more components. In this example of a punctured compressor, two limits will be increased: (1) the limit on high pressure turbine inlet temperature will be raised, and (2) that on the speed of the high pressure turbine will be raised.

The latter increase will increase mass flow through the compressor, which will compensate for the mass of air lost through the hole 39.

The effect of the former increase is not so simple to explain, but can, in general, be explained by the fact that the energy extracted by a turbine is related to the temperature drop across it. If the inlet temperature of the two-turbine system of FIG. 2 is increased, then, in general, those turbines will extract more energy.

Figure 3:
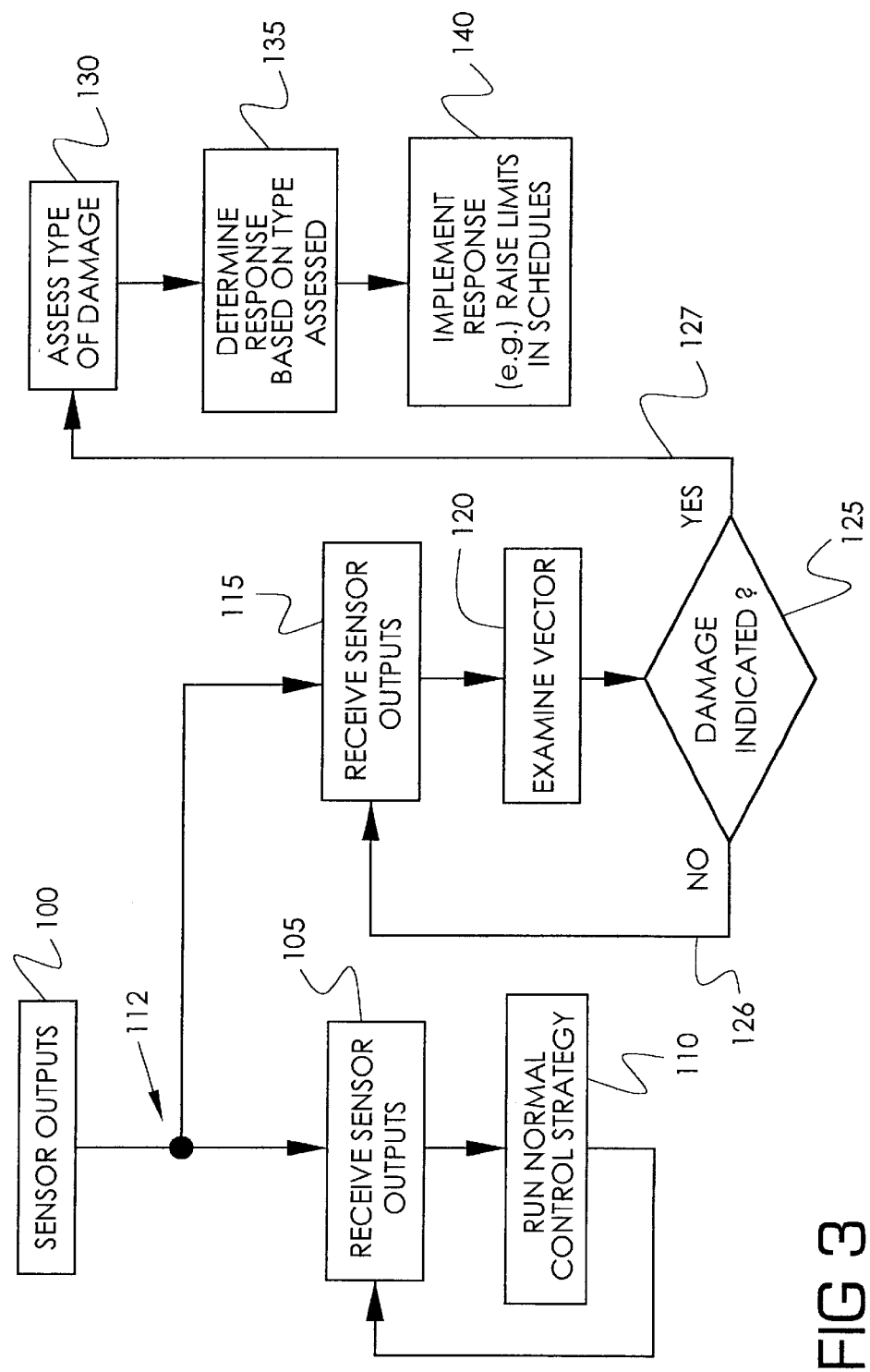
FIG. 3 is a flow chart illustrating processes undertaken by one form of the invention.

FIG. 3 is a flow chart illustrating a generalized process undertaken by the invention. Block 100 represents the collective outputs of the engine sensors. The modern gas turbine aircraft engine is equipped with an array of numerous sensors, which measure temperatures and pressures at various locations, and the speeds of the rotors. Many of the sensors, termed prime sensors, are equipped with back-up sensors, which provide redundancy in the event that the prime sensors fail.

The sensor outputs are received by the engine control (not shown), as indicated by block 105. Block 110 represents the engine control procedures, or algorithms, which are implemented by the engine control. The Inventors point out that block 110 is a simplification, and the actual control system, and its processes, are quite complex.

Engine control systems generally are well known. The control system controls various operating conditions of the engine 3, such as (1) fuel-air ratio, (2) stator vane angle, (3) compressor bleeds, (4) turbine shroud cooling, and so on. These controlled parameters are not shown in the Figures, but are known in the art.

Branch point 112 in FIG. 3 indicates that the sensor outputs are fed to another destination, namely, block 115, where they are subsequently utilized by the invention. The outputs received by block 115 may include all the outputs of all sensors, or may include only outputs of a subset of the sensors.

In general, a vector of sensor outputs will be examined. The vector can be represented as $(P1, P2, \ldots PN, N1, N2, \ldots NN, T1, T2, \ldots TN)$ Herein P represents pressure, N represents speeds, and T represents temperatures. The subscripts, namely, 1, 2, and N, indicate that pressures, speeds, and temperatures at different locations in the engine are measured. Other parameters may be measured as well, such as vibration or deflection.

Block 120 indicates that the vector is examined. The overall goal is to determine whether the vector indicates that damage to the engine has occurred. Numerous approaches to making this determination are possible.

In one approach, inquiry is made as to whether selected parameters are within stated limits. For example, if compressor discharge pressure, at cruise conditions, stands below a certain value, then the presence of damage may be inferred.

In a second approach, the vector is examined for a healthy engine under normal operating conditions. Then, a selected item of damage is introduced, and the corresponding vector is examined. Next, a different type of damage is introduced, and the process is repeated.

In effect, this approach derives a signature for each type of damage. Types of damage which may be inflicted can include (1) punctures at various locations, of various sizes, (2) severance of selected hydraulic, pneumatic, and electrical lines, (3) loss of blades, or partial blades, in the fan, compressor, and turbines, and (4) others.

In a third approach, damage is not actually introduced, as in the second approach, but the damage is synthesized, in computer models. Very sophisticated computer models have been developed which represent operation of gas turbine engines under many, if not all possible, operating conditions. The damage can be synthesized in the model, and the resulting signature of the vector can be ascertained.

In a fourth approach, the damage signature of a vector is reached by the instinct and experience of the designers of the gas turbine engine.

Block 125 in FIG. 3 indicates that inquiry is made as to whether damage is present. If no damage is inferred, the NO branch 126 is taken, and the process repeats, beginning with block 115. If damage is inferred, the YES branch 127 is taken, and block 130 is reached.

Block 130 indicates that the type of damage is assessed. Block 135 indicates that a type of response is determined, based on the damage assessment. The Inventors point out that blocks 130 and 135 are represented as separate, for purposes of explanation. In practice, it is likely that block 130 may be eliminated.

For example, in practice, each damage signature in the vector is assigned a response. In the compressor-puncture situation described above, the signature may be a drop in compressor discharge pressure. The responses may be to (1) raise the limit on turbine inlet temperature and (2) raise the limit on speed of the high-pressure compressor 12. However, no actual conclusion that a compressor problem exists is necessarily reached, or needed.

Therefore, block 130 is shown in order to illustrate one concept behind one form of the invention. But an actual assessment, that is, assignation of a name to the damage, is not strictly necessary. Rather, a direct jump from (1) detection of a deviant vector to (2) a response for that deviation can be undertaken.

Block 140 indicates that the response suitable for the damage indicated by the vector is implemented.

The processes of FIG. 3 can be implemented in a single computer, or multiple computers.

Several features and characterizations of the invention will be given.

One is that the engine operates according to one control strategy during normal operation. The invention looks for damage. If damage is detected, a different control strategy is implemented. One example of a different control strategy is to raise the limit on turbine inlet temperature, such as by four percent. Another example is to raise the limit on core speed, such as by four percent. A third example lies in combining the first and second example. A generalized example is to allow a selected operating parameter of the engine to rise above its normal operating value.

The term normal operation is known in the art. However, it should not be assumed that, for a given engine, normal operation always means that similar amounts of deterioration occur during all phases of operation. For example, the operating conditions during take-off are harsher than cruise conditions, and greater deterioration occurs at take-off than at cruise.

One definition of normal operation is that an engine is operating in normal mode when actual thrust matches demanded thrust. Demanded thrust is generally determined by throttle lever angle. Other definitions are possible.

A second feature is that the second control strategy involves altering the schedule of a controlled variable. The term schedule is well known, and refers to the fact that a controlled parameter, such as amount of fuel flow, is computed, or scheduled, based on numerous other measured parameters, such as rotational speeds, pressures, temperatures, and so on.

A third feature is that no additional sensors are required. The existing sensors on the engine, or a subset of them, whose outputs are represented in the vector discussed above, are used. The parameters indicated by those sensors are used to infer the presence of damage, and select, or modify, the control strategy.

A fourth feature is that a library of numerous possible damage signatures of the vector delivered to block 115 in FIG. 3 is maintained. When a damage signature is detected, a malfunction is declared. The declaration can take the form of informing the pilot of the presence of the malfunction and, optionally, of the identity of the malfunction. The identity is associated with the damage signature at the time of creation of the signature.

A fifth feature is that, in normal operation, the control operates the engine so that no parameters, such as pressures, temperatures, and speeds, exceed pre-defined limits. The invention maintains (1) a library of damage signatures, each corresponding to a specific damage condition, and (2) a control strategy for each signature, and thus for each damage condition. The invention compares the currently derived vector of operating parameters with the library and, if a match is found, implements the control strategy corresponding to the matched vector.

In one embodiment, the selected control strategy causes at least one operating parameter to exceed its previous pre-defined limit. In another embodiment, the selected control strategy causes at least one control schedule to change. In a third embodiment, the selected control strategy causes both the changes described in the preceding two sentences.

A sixth feature is that the invention monitors a set of parameters which are used by a control system to control operation of the engine. If the monitoring indicates that a predetermined event has occurred, such as a specific type of damage, then the invention moves a limit on temperature or speed away from its normal operating position, and continues operation of the engine.

A seventh feature is that a gas turbine engine is operated having limits on (1) turbine inlet temperature and (2) speed of a high-pressure turbine. Selected parameters are monitored and, if the parameters, or a subset of them, reach a predetermined state, then one, or both, of the limits are raised.

In one embodiment, the predetermined state is that engine thrust is less than 95 percent of demanded thrust.

In another embodiment, the limit on turbine inlet temperature is raised by 2.5 percent.

In another embodiment, the limit on turbine speed is raised by 4 percent.

An eighth feature is that a gas turbine engine is run in its normal mode. The invention monitors the engine and, if a predetermined event is detected, such as a specific type of damage, then the control system causes the engine to run at the maximum power available for 30 minutes, with no regard for damage inflicted on the engine during that time. That is, it is acceptable to destroy the engine over that 30-minute period, provided the maximum power available is obtained.

The preceding example stated that the engine was run at maximum available power for 30 minutes. The duration of running the engine can be measured by another parameter, namely, extent of fuel supply.

Figure 4:
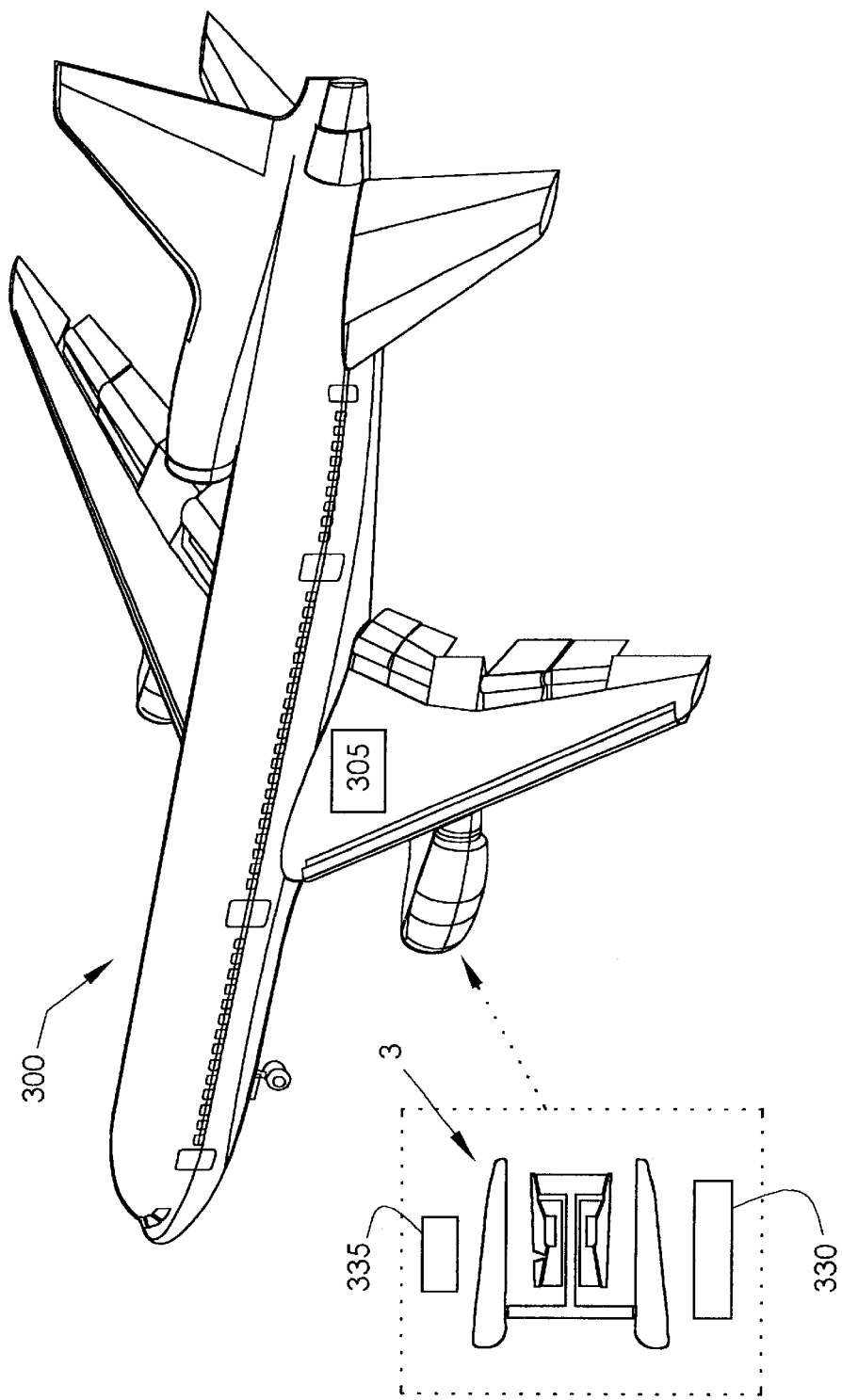
FIG. 4 illustrates one form of the invention.

For example, the engine 3 is contained in a vehicle, such as aircraft 300 in FIG. 4. The aircraft 300 carries fuel in one or more tanks 305. Computer hardware and software, represented by block 330, undertake the processes described herein. The library of reference signatures described above is contained in block 330. Block 335 represents hardware and software implementing the ordinary engine control system described above. It is understood that blocks 330 and 335 need not be completely separate as indicated, but that high degrees of integration between them can be implemented.

If a malfunction or damage as described herein is detected, then the remaining useful lifetime of the engine 3 is consumed before the supply of fuel in tanks 305 is exhausted. Alternately, the engine is run at maximum available power until the supply of fuel is exhausted.

A ninth feature is that a gas turbine engine is run in a normal manner, in accordance with a set of control algorithms. A set of the operating parameters is obtained, and examined by a pattern recognizer. Pattern recognizers are known in the art. The pattern recognizer examines the set of operating parameters, and looks for a pattern indicating a problem has occurred in the engine. The pattern recognizer may do this by comparing the set of parameters with stored signatures of parameters, each of which indicates a specific problem. If a problem is found, the set of algorithms is altered, and the engine is continued to run.

Numerous substitutions and modifications can be undertaken without departing from the true spirit and scope of the invention. For example, the invention has been framed in terms of an aircraft engine. However, land-based engines, such as those used in armored tanks, can utilize the invention, as well as sea-based engines, such as those used in ships.

What is desired to be secured by Letters Patent is the invention as defined in the following claims.

What is claimed is:

1. A method, comprising:
   a) operating a gas turbine engine according to a first control strategy;
   b) looking for damage to the engine; and
   c) if damage is found, operating the engine according to a second control strategy that enables an operating parameter of the engine to exceed its normal operating value.

2. Method according to claim 1, wherein the second control strategy allows an operating parameter of the engine to exceed its normal operating value by four percent.

3. Method according to claim 1, wherein the second control strategy changes the schedule of a controlled variable.

4. A method, comprising:
   a) delivering measured operating parameters in a gas turbine engine to a control which controls engine operation;
   b) using some, or all, parameters to infer damage to the engine;
   c) if damage is inferred, altering control strategy of the engine to enable at least one operating parameter of the engine to exceed its normal operating value.

5. A method of operating a gas turbine engine, comprising:
   a) maintaining a library of reference signatures of operating parameters, each of which represents a respective damage condition in the engine;
   b) monitoring current operating parameters, and comparing them with the library; and
   c) if the current operating parameters match a reference signature, declaring a malfunction.

6. A method, comprising:
   a) controlling a gas turbine engine in a manner that no operating parameters exceed pre-defined limits;
   b) examining operating parameters for a damage signature indicating the existence of damage to the engine; and
   c) if a damage signature is found, controlling the engine so that at least one of the operating parameters exceeds its limit.

7. A method, comprising:
   a) controlling a gas turbine engine in a manner that no operating parameters exceed pre-defined limits;
   b) maintaining a library of reference damage signatures, wherein each signature indicates a different damage condition of the engine;
   c) maintaining a collection of control strategies, each strategy corresponding to a different damage condition;
   d) deriving a vector of operating parameters from the engine;
   e) based on a comparison of the vector with the library,
      i) determining whether a damage condition exists, and
      ii) if so, selecting a corresponding control strategy and implementing it.

8. Method according to claim 7, wherein the selected control strategy causes at least one operating parameter to exceed its limit.

9. Method according to claim 7, wherein the selected control strategy changes the control schedule of at least one controlled variable.

10. Method according to claim 7, wherein the selected control strategy causes
    i) at least one operating parameter to exceed its limit, and
    ii) a change in the control schedule of at least one controlled variable.

11. A method, comprising:
    a) operating a gas turbine engine in a normal mode, in a vehicle which carries a supply of fuel burned by the engine;
    b) monitoring behavior of the engine and, if a predetermined event occurs which is indicative of damage occurring to the engine, operating the engine at the maximum operating power level available from the damaged engine to facilitate consuming substantially all of the remaining operating life of the engine before the supply of fuel is exhausted.

12. Method according to claim 11, wherein monitoring behavior of the engine further comprises operating the engine at the maximum operating power level such that operating parameters of the engine are allowed to exceed normal operating limits to facilitate consuming substantially all of the remaining operating life of the engine within approximately 30 minutes of the time any operating parameter exceeds its normal operating limits.

13. A method, comprising:
    a) operating a gas turbine engine in accordance with a first set of algorithms;
    b) obtaining a set of operating parameters
    c) using a pattern recognizer to
       i) ascertain whether a problem has occurred in the engine and,
       ii) if so, identify the problem;
    d) if the problem is identified, altering the set of algorithms.

* * * * *